United States Patent

[11] 3,624,741

| [72] | Inventor | Raymond L. Dills<br>Louisville, Ky. |
|---|---|---|
| [21] | Appl. No. | 58,040 |
| [22] | Filed | July 24, 1970 |
| [45] | Patented | Nov. 30, 1971 |
| [73] | Assignee | General Electric Company |

[54] RACK SLIDING SURFACES FOR CATALYTIC COATED OVEN
5 Claims, 4 Drawing Figs.

[52] U.S. Cl..................................................... 126/19 R,
126/273 R, 126/337 R
[51] Int. Cl...................................................... A21b 1/00,
F24c 15/16
[50] Field of Search........................................ 126/19 R,
21 R, 21 A, 273 R, 337 R, 339, 340

[56] References Cited
UNITED STATES PATENTS

| 3,266,477 | 8/1966 | Stiles............................ | 126/19 |
| 3,291,113 | 12/1966 | Scott............................ | 126/339 X |
| 3,425,405 | 2/1969 | Dills............................. | 126/19 |
| 3,547,098 | 12/1970 | Lee.............................. | 126/19 |
| 3,566,855 | 3/1971 | Morgan........................ | 126/19 |

*Primary Examiner*—Charles J. Myhre
*Attorneys*—Richard L. Caslin, Francis H. Boos, Jr., Frank L. Neuhauser, Oscar B. Waddell and Joseph B. Forman ABSTRACT: This invention pertains to a cooking oven having a boxlike oven liner and a front-opening access door. The oven liner has a plurality of vertically spaced embossments that serve as adjustable support means for one or more food supporting racks that are suspended between opposite sidewalls of the oven liner. The walls of the oven liner have a first corrosion resisting coating; and, except for the top surfaces of the embossments which engage the oven rack, a second coating of porcelain enamel including an oxidizing catalyst exposed on the surface thereof. Any food soils lodged on the second catalytic coating during normal cooking operations will be oxidized at oven temperatures above about 400° F.

PATENTED NOV 30 1971
3,624,741
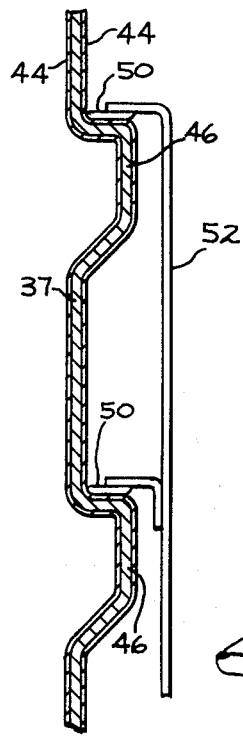
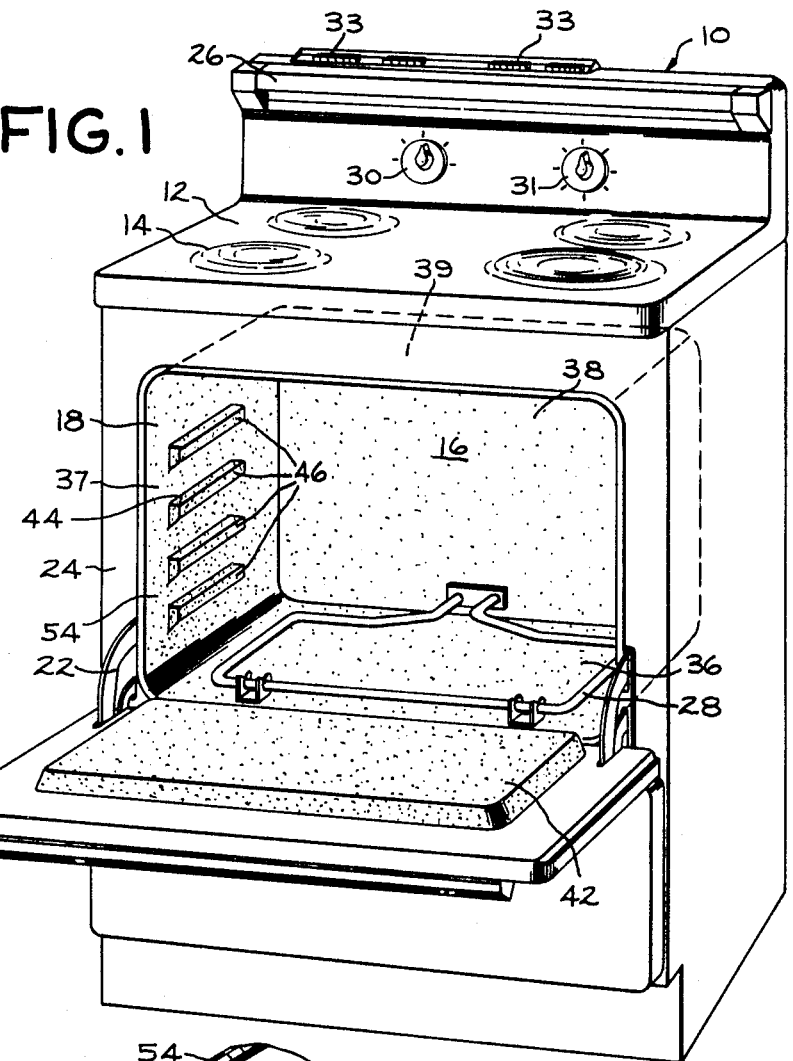
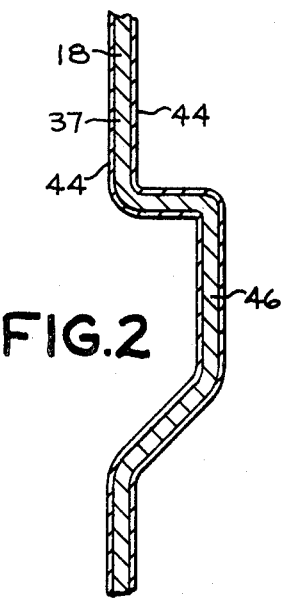
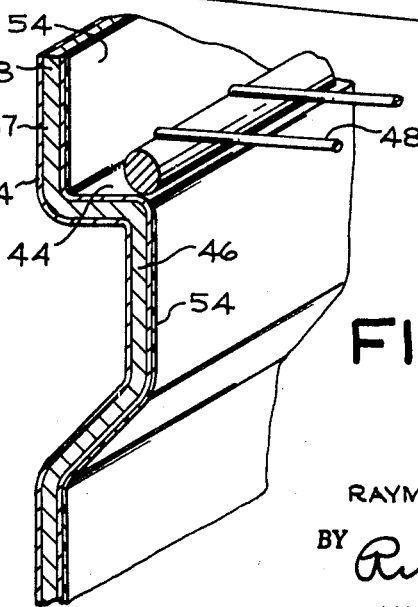
FIG.1
FIG.2
FIG.3
FIG.4
INVENTOR.
RAYMOND L. DILLS
BY Richard L. Caslin
HIS ATTORNEY 3,624,741

RACK SLIDING SURFACES FOR CATALYTIC COATED OVEN

BACKGROUND OF THE INVENTION

A new era in ease of oven cleaning was started with the teachings of the Hurko U.S. Pat. No. 3,121,158 which taught a pyrolytic self-cleaning oven system for removing food soil lodged on the walls of the oven cavity by raising the oven temperature above about 750° F.

Later, ovens were built following the teachings of the Stiles U.S. Pat. No. 3,266,477 which taught a catalytic coated oven cleaning system providing for the continuous cleaning of the food soil at temperatures below normal pyrolytic temperatures, and usually at the high end of the temperature scale of normal cooking temperatures; above about 400° F. In the latter oven design, the catalyst covers the oven walls and causes the oxidation of the food soil theoretically during normal cooking operations but mostly at the high end of the cooking temperature scale.

Before the present invention, all catalytic coated ovens were believed to employ oven racks that were supported on removable rack support members mounted adjacent the opposite sidewalls of the oven liner. It has been found that the most acceptable catalytic coatings are unable to withstand the abrasive sliding action of the oven rack. Moreover, there is a tendency for the catalyst to corrode the nickel and chromium used in plating the oven racks to give them a smooth, bright and temperature resisting finish.

The principal object of the present invention is to provide a catalytic coated oven liner with a plurality of vertically spaced horizontally disposed rack supporting embossments where the surfaces of the embossments which engage the oven racks are free of the oxidizing catalyst and are protected with a corrosion resisting coating.

A further object of the present invention is to provide a catalytic coated oven liner with integral rack supports, where the rack supports have areas engageable with the oven racks that are free of the oxidizing catalyst.

A further object of the present invention is to provide a cooking oven of the class described with the walls of the oven liner provided with a first coating of corrosion resistant material, and except for the rack supporting embossments a second porous porcelain enamel coating including an oxidizing catalytic agent for removing the food soils lodged on the catalytic coating of the oven at temperatures above about 400° F.

SUMMARY OF THE INVENTION

The present invention, in accordance with one form thereof, relates to a baking oven having an oven cooking cavity formed by a boxlike oven liner and a front-opening access door. The oven liner is provided with at least one food supporting rack, and the opposite sidewalls of the oven liner are provided with a plurality of horizontally disposed, vertically spaced rack supporting embossments. The oven liner is furnished with a first corrosion resisting coating and except for the surfaces of the rack supporting embossments that are engageable with the said rack there is a second coating of porous porcelain enamel with an oxidizing catalytic agent covering the inner walls of the oven liner such that food soils lodged on the said second catalytic coating are gradually removed at oven temperatures above about 400° F.

BRIEF DESCRIPTION OF THE DRAWINGS

This invention will be better understood from the following description taken in conjunction with the accompanying drawings and its scope will be pointed out in the appended claims.

FIG. 1 is a perspective view of a free-standing electric range having a catalytic coated oven embodying the present invention.

FIG. 2 is a fragmentary, cross-sectional elevational view on an enlarged scale taken through one of the rack supporting embossments on the left sidewall of the oven liner of FIG. 1 showing a first corrosion resisting coating covering the metal liner.

FIG. 3 is a fragmentary, cross-sectional elevational view similar to that of FIG. 2, but showing two vertically spaced rack supporting embossments and a mask or shield placed over the top surface of the embossments during the processing of the oven liner before the application of the second catalytic coating on the inner side of the oven liner.

FIG. 4 is a fragmentary cross-sectional perspective view taken of a rack support embossment taken on the same line as FIG. 2 but showing a second coating of porous porcelain enamel containing an oxidizing catalytic agent applied on the inner surface of the oven liner over the first corrosion resisting coating except for the top surface of the rack supporting embossment.

DESCRIPTION OF THE PREFERRED EMBODIMENTS

Turning now to a consideration of the drawings, and in particular to FIG. 1, there is shown a free-standing electric range 10 in which is incorporated the oven invention disclosed herein, but it could just as well be a gas range; or for that matter, either a domestic or a commercial oven, as will be well understood by those skilled in this art. This electric range 10 has a horizontal cooktop 12 at waist height supporting a plurality of surface heating elements 14. Located therebeneath is an oven cooking cavity 16 formed by a boxlike oven liner 18 and a front-opening access door 20 that is shown in its horizontal fully opened position so as to present a clear view in the interior of the oven. An outer range body or cabinet structure 24 of sheet metal construction supports the various subassemblies of the range in a single appliance. The oven door 20 is supported on hinge straps 22 at the two lower corners thereof which extend into the front of the range body 24 and are provided with a counterbalance system (not shown) for assisting in holding the door closed when it is in its vertical position so that the door does not drop open of its own weight. Arranged along the back edge of the cooktop 12 is a backsplash 26 which supports various electrical control components for both the surface heating units 14 and the oven heating units, only one of which is shown; namely, the lower baking element 28. There would also be an upper broiling element. For example, there is an oven selector switch 30 and an oven thermostat 31, and a multiple selector switch 33 for each one of the four surface units 14. Of course, there are other control features that are available and could be supplied with the range such as an automatic clock-timer for the oven, an automatic surface unit control, a convenience outlet, an electric meat thermometer for the oven and the like.

Returning to the oven cooking cavity 16, the oven liner 18 is shown with a bottom wall 36, opposite sidewalls 37, a back wall 38 and a top wall 39. The present invention is related to various steps for processing the oven liner 18 and perhaps the inner door panel 42 of the oven door 20 which protrudes into the front opening of the oven liner and serves as a removable front wall of the oven walls. The opposite sidewalls 37 of the oven liner 18 are each provided with a plurality of horizontally disposed, vertically spaced rack supporting embossments 46. The oven is furnished with at least one and preferably two welded-wire oven racks 48, only a portion of one being shown in FIG. 4. Traditionally these racks are plated with a nickel chromium coating so that they maintain a bright smooth appearance under the temperature conditions and the exposure to food soils during normal cooking operations as well as to clean chemicals and abrasive pads or other mechanical means for removing baked on food soils from the racks when the racks are taken to the kitchen sink for cleaning.

Looking at FIG. 2, the metal oven liner 18 is shown coated on both sides with a first corrosion resistant coating 44 which may be a ground coat of porcelain enamel or a cover coating of porcelain enamel. Another alternative would be to form the oven liner of stainless steel. A preferred embodiment is a previously fired vitreous coating 44 which has a substantially smooth glassy surface.

It is next desirous to apply a catalytic coating over the first coating 44 on the inner surface of the oven liner 18 and the inner door panel 42. One deterrent to the use of such a catalytic coating is that the preferred catalytic materials are rather soft in nature and are not capable of withstanding hard wear. Moreover, they have the ability to corrode the nickel chromium plating used in protecting the oven rack 48. In catalytic coated ovens prior to this invention, removable ladderlike, nickel chromium plated oven rack support means were assembled across the face of the opposite sidewalls of the oven liner, and the racks were supported from these ladderlike members. However, in standard oven designs the most common means of supporting oven racks is by use of embossments such as embossments 46 shown in FIG. 1. This has influenced the technique of masking or shielding the areas of the embossments 46 which come in contact with the oven rack 48. An accepted technique is to provide magnetic strips 50 which are placed over the top edge of each embossment 46 and are preferably joined by at least one and possibly two spaced, vertical straps 52 which are fastened to each magnetic shield 50 so that it is easy for the operator to pick up all four shields at the same time and place them on the embossments 46 prior to applying the second catalytic coating.

This second coating is identified as coating 54 in FIG. 4. You will notice that it covers the first coating 44 on the inner surface of the oven liner, except on the top edge of the embossments 46, which serves as a ledge on which the oven rack 48 is adapted to slide in and out of the oven cooking cavity 16. Of course, if the rack supporting embossments 46 had other surfaces than the top surface for supporting the oven rack 48 then these other surfaces would also be devoid of the catalytic coating 54. This second catalytic coating 54 is a porous porcelain enamel coating containing an oxidizing catalyst such as oxides of manganese, some of which is exposed on the outer surface of the second coating 54 such that it is exposed to the oxygen in the oven atmosphere. This exposure of the catalytic agent is necessary in order for the catalyst to function in removing food soils lodged on the catalytic coating 54 during normal cooking operations when the oven temperature is raised above about 400° F.

One important advantage in providing the second coating 54 with a porous finish is that it tends to divide or break up the food soil into shallow pools of grease spatter or food drippings such that areas surrounding the pores are more inclined to be exposed to the oxygen in the oven atmosphere and capable of oxidizing the fringe area of the soil within the pores. This is to be distinguished from a second catalytic coating 54 which might have a smooth glassy finish which might tend to bury or encapsulate the catalytic agent within the porcelain enamel or allow the food soil to smother the catalyst when the soil forms into a thin continuous film.

The small dots covering the inner walls of the oven liner 18 and the inner door panel 42 in FIG. 1 represent white stippling in a move to brighten the dark coloring of the catalytic coating 54.

Modifications of this invention will occur to those skilled in this art, therefore it is to be understood that this invention is not limited to the particular embodiments disclosed, but that it is intended to cover all modifications which are within the true spirit and scope of this invention as claimed.

What is claimed as new and is desired to be secured by Letters Patent of the United States is:

1. A cooking oven comprising walls forming a boxlike oven liner and a front-opening access door, said oven liner having a bottom wall, opposite sidewalls, a rear wall and a top wall, heating means for the oven, food supporting rack means adapted to be suspended between the opposite sidewalls, said sidewalls each being furnished with a plurality of horizontally disposed vertically spaced rack supporting ledges, said sidewalls being covered with a first porcelain enamel coating and, except for the top surface of the said rack supporting ledges, being coated with a second porous porcelain enamel coating that is furnished with a catalytic oxidizing agent for removing food soils lodged on the said catalytic coated sidewalls at oven temperatures above about 400° F.

2. A cooking oven comprising walls forming a boxlike oven liner and a front-opening access door, said oven liner having a bottom wall, opposite sidewalls, a rear wall and a top wall, heating means for the oven, food supporting rack means adapted to be suspended between the opposite sidewalls, said sidewalls each being furnished with a plurality of horizontally disposed vertically spaced rack supported embossments, said oven walls being covered with a first corrosion resisting coating and, except for the top surfaces of the said rack supporting embossments, being coated with a second porous coating of porcelain enamel that is furnished with a catalytic oxidizing agent some of which catalytic agent is exposed on the surface of the said second coating for removing food soils lodged on the said second coating at oven temperatures above about 400° F.

3. A cooking oven comprising walls forming a boxlike oven liner and a front-opening access door, said oven liner having a bottom wall, opposite sidewalls, a rear wall and a top wall, heating means for the oven, food supporting rack means adapted to be suspended between the opposite sidewalls, said sidewalls each being furnished with a plurality of horizontally disposed vertically spaced rack supporting embossments, said walls of the oven liner being covered with a first corrosion resisting coating, and, except for the top surfaces of the said rack supporting embossments, being coated with a second porous coating of porcelain enamel that contains an oxidizing catalyst exposed to the oxygen in the oven atmosphere for removing food soils lodged on the second catalytic coating at oven temperatures above about 400° F.

4. A cooking oven comprising walls forming a boxlike oven liner and a front-opening access door, said oven liner having a bottom wall, opposite sidewalls, a rear wall and a top wall, heating means for the oven, food supporting rack means adapted to be suspended between the opposite sidewalls, said sidewalls each being furnished with a plurality of horizontally disposed vertically spaced rack supporting embossments, said invention comprising said walls of the oven liner being covered with a first vitreous coating, and a second porous coating of porcelain enamel containing an oxidizing catalytic agent exposed on the inner surface thereof, said second coating covering the walls of the oven liner except for the surfaces of the said rack supporting embossments that are engageable with the said rack means whereby food soils lodged on the said second catalytic coating are gradually removed at oven temperatures above about 400° F.

5. A cooking oven comprising walls forming a boxlike oven liner and a front-opening access door, said oven liner having a bottom wall, opposite sidewalls, a rear wall and a top wall, heating means for the oven, food supporting rack means adapted to be suspended between the opposite sidewalls, said sidewalls each being furnished with a plurality of horizontally disposed vertically spaced rack supporting embossments; the invention comprising the walls of the oven liner being covered with a first coating of porcelain enamel, and a second coating of a catalytic carrier which supports an oxidizing catalyst exposed on the surface thereof covering the first coating except for the areas of the said rack supporting embossment that are engageable with the said rack means, whereby food soils lodged on the said second catalytic coating are oxidized at oven temperatures above about 400° F.

* * * * *